United States Patent [19]
Baptiste et al.

[11] Patent Number: 5,473,717
[45] Date of Patent: Dec. 5, 1995

[54] WALL OUTLET FOR CONNECTION FOR OPTICAL WIRING SYSTEM OF BUILDINGS

[75] Inventors: René Baptiste, Elancourt; Gilbert Takats, le Mesnil Saint Denis, both of France

[73] Assignee: Bull S.A., Paris, France

[21] Appl. No.: 275,874

[22] Filed: Jul. 15, 1994

[30]    Foreign Application Priority Data

Dec. 21, 1993 [FR]   France ................................. 93 15389

[51] Int. Cl.$^6$ .................................................. G02B 6/36
[52] U.S. Cl. ............................... 385/76; 385/56; 385/59; 385/71
[58] Field of Search ................................. 385/53, 55, 56, 385/58–60, 70–72, 76–78, 88, 89, 92; 439/113–115, 120, 536, 577

[56]                References Cited

U.S. PATENT DOCUMENTS

| | | | |
|---|---|---|---|
| 4,611,887 | 9/1986 | Glover et al. | 385/71 |
| 4,874,904 | 10/1989 | DeSanti | 385/92 X |
| 4,950,184 | 8/1990 | Caveney et al. | 439/536 |
| 4,960,317 | 10/1990 | Briggs et al. | 385/56 |
| 5,076,656 | 12/1991 | Briggs et al. | 385/71 |
| 5,142,597 | 8/1992 | Mulholland et al. | 385/56 |

Primary Examiner—John D. Lee
Attorney, Agent, or Firm—Kerkam, Stowell, Kondracki & Clarke; Edward J. Kondracki

[57]                ABSTRACT

A wall outlet ($PMI_1$ through $PMI_3$) for connection of an optical building wiring system is provided, including a receptacle (RI, $RI_3$) adapted to be fixed in the baseboard (PL) of the wall, into which receptacle optical cords ($CO_i$, $CO_j$, $CO_1$ through $CO_4$) carrying information to be transmitted to a local area network of a building including a plurality of terminals are inserted, the cords are connected to a terminal associated with the outlet. A removable cover ($CI_1$ through $CI_3$) is associated with a removable carrier ($SCI_1$) of connectors that enables the optical connection of the cords. The cover is capable of occupying a first standby position, in which it closes the front face of the receptacle, and a second active position for use where the plane of the cover forms a dihedron with the front face. The cords exit laterally relative to the receptacle on either side thereof, parallel to the baseboard. First positioning elements ($GMI_1$–$GMI_2$, $G_1$, $EG_2$) cooperate with second positioning elements ($GI_1$–$GI_6$, $EC_1$–$EC_2$, $EC_3$–$EC_4$), belonging to the receptacle, in such a way as to shift the cover from the standby position to the position for use.

10 Claims, 8 Drawing Sheets

WALL OUTLET FOR CONNECTION FOR OPTICAL WIRING SYSTEM OF BUILDINGS

FIELD OF THE INVENTION

The present invention relates to a wall outlet for connection of an optical wiring system in buildings. Hence it is more particularly applicable to local area networks in which the transmission carrier is preinstalled in all the offices of an industrial- or commercial-type building, in which the business that occupies it is equipped with a local area network of its own which enables a plurality of information processing terminals (word processing system, desktop computer, etc.) which are installed in each of the offices of the building to communicate with one another.

BACKGROUND OF THE INVENTION

A data transmission network is known to be made up of a plurality of units, generally called terminals or stations. The latter communicate with one another by way of a transmission system that has a physical transmission carrier made up of either two pairs of telephone wires or a coaxial cable or optical fiber cables.

Local area networks are transmission networks limited to a region of limited surface area (building, factory, campus, hospital, etc.), where the distances between stations range from several meters or tens of meters to several kilometers. When this local area network is located in a building, it is increasingly often prewired. This means that all the physical transmission links of the network are installed in the building beforehand, before the users of the building occupy the various places in it.

In general, a prewired building includes a general distributor and a plurality of subdistributors. The subdistributors are the basic elements of the wiring system. It is through them that all the local information processing or office automation links, and those of the switched (telephone) network serving all the offices located within a radius of 200 m around the subdistributor converge. The function this subdistributor performs in the area where it is located is patching. This patching makes it possible to create different links which are needed because of the prewiring of the building. It is generally at the level of the subdistributor that the interconnection with the networks of the higher category, to which the local area network of the building is connected is done. The subdistributor then receives the gateways with the other networks and also includes the repeaters of the building network and concentrators. The physical transmission links are installed between the subdistributors and the offices. Naturally, a plurality of subdistributors may be connected among one another to the general distributor.

Increasingly often, the physical transmission links are made up of optical fibers, which enable extremely high transmission rates, up to one or more hundred megabits (Mbits) per second, while maximally limiting line losses.

Prewired building networks using any of the physical transmission carriers discussed above are described in more detail for instance in the commercial brochures, put out by the Bull Corporation, on the Bull Cabling System (BCS), a cabled network commercial sold by Bull. In each office, a certain number of connection outlets is fixed to the baseboard of walls, located in the lower portion of the walls closest to the floor, the outlets being intended to connect the cords from the terminal or terminals installed in each of bureaus.

When the local area network uses a transmission carrier made up of optical fiber cables, the wall outlets are optical connection outlets (the term "optical wall access point" is also used).

In current practice, optical prewiring of buildings involves practically only the main skeleton of the wiring and does not extend to the level of the offices, for reasons of customer needs and the cost of this prewiring. Nevertheless, a certain number of manufacturers and customers are interested in wall connection outlets, and one may expect that in the next few years, the technique of developing optical wall connection outlets will gain increasing success.

An optical wall connection outlet preferably has the following characteristics:

a relatively low cost; and capable of being prewired or postwired;

in postwiring, it should be capable of being installed on demand, should be capable of being moved around, must be capable of being installed, or removed, very quickly, should not require particular tools to be installed, should enable very simply coiling up a certain length of optical cable without excessive strain on the cable, and if possible inside the baseboard; in particular, it must take into account the maximum radius of curvature that a cord of optical fiber can undergo so that it can be coiled without being damaged, finally, it should have a low cost.

In prewiring, the qualities desired for an optical wall connection outlet are as follows:

it should enable a user to be connected rapidly;

it should enable simple coiling of a certain length of cable without excessive strain on it; and it should have a very low cost before use, with the prewiring access point being standardized.

Moreover, in either case (postwiring or prewiring), the wall outlet must have a standard format, that is, the shape of a mosaic 50×50 mm in size, or optionally 45×45 mm, which will be the standard used in coming years. In addition, the optical wall connection outlet must be capable of accepting all types of connector.

In general, existing optical wall connection outlets are in the following form, described in conjunction with FIGS. 1a and 1b.

Figure 1A:
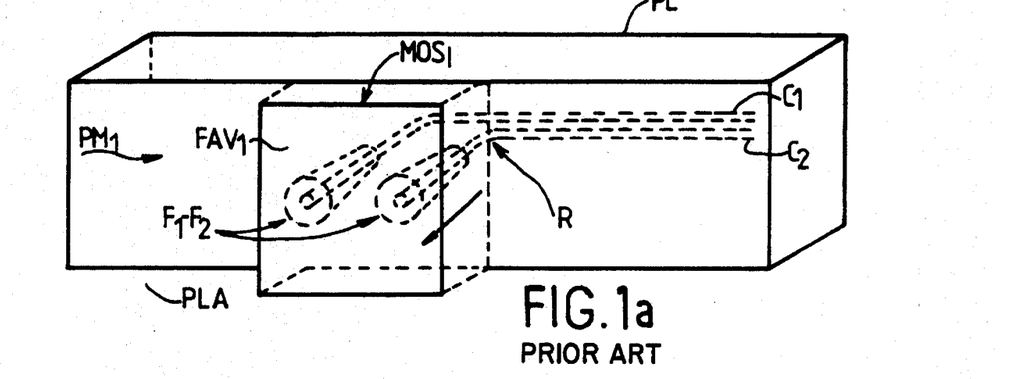

In FIG. 1a, a wall outlet of a first type, $PM_1$ is seen, which is made up of a mosaic $MOS_1$ of rectangular parallelepiped form fixed to the baseboard PL of the wall, the wall not being shown for the sake of simplicity in the drawing. The outlet $PM_1$ also includes two connection plugs $F_1$, $F_2$ which are perpendicular to the front face $FAV_1$ of the mosaic, the plane of which front face is parallel to the plane of the wall. The connection plugs $F_1$ and $F_2$ in fact have an oblong shape, and the language is misused when it is said they are perpendicular to the front face $FAV_1$, when in fact it is their axis of longitudinal symmetry that is perpendicular to the surface of the wall, which is perpendicular to this front face. In FIG. 1a, two optical fibers cords $C_1$, $C_2$ are also seen, connected to the two plugs $F_1$ and $F_2$, respectively. To accomplish this, the two cords, which as shown in this same drawing figure arrive parallel to the wall and to the surface of the floor PLA must be bent to be connected to the two plugs $F_1$ and $F_2$ over an extremely short distance, so that these cords $C_1$ and $C_2$ do not have a insignificant radius of curvature R. As a result, it is difficult to coil the cable inside the baseboard in the vicinity of the plugs $F_1$ and $F_2$. In the case of the wall outlet $PM_1$, the connection of the connection cords of the terminal is done in place.

Moreover, the wall outlets of the prior art have the following disadvantages:

they do not generally accept more than a single type of connection;

the direction in which the cords in use exit, toward the terminal or the station, is fixed;

the wall outlet installed, in the case of prewiring, is cumbersome and this is true even if it remains unused thereafter, because it is systematically equipped with its connectors; and finally, it has only a single function: To connect the station or terminal to the incoming cable from the subdistributor.

Figure 1B:
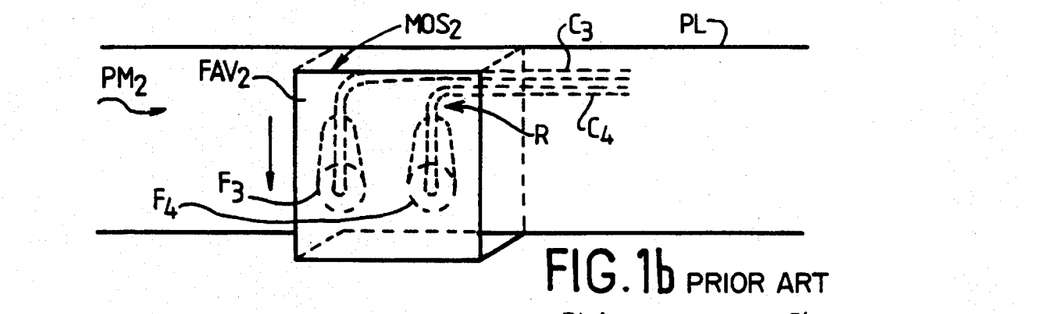

Turning now to FIG. 1b, a wall outlet $PM_2$ is shown which includes a mosaic $MOS_2$ with a front face $FAV_2$ having the same parallelepiped rectangular form as $MOS_1$ and fixed to the baseboard PL in the same way. This wall outlet $PM_2$ includes two connection plugs $F_3$ and $F_4$, which are perpendicular to the surface of the floor PLA and are accordingly oriented downward. In this same drawing, one can also seen the connection cords $C_3$ and $C_4$ connected to the plugs $F_3$ and $F_4$, and one can observe the presence of a not-insignificant radius of curvature R, which is made necessary to enable connection of the two cords to the two outlets. The disadvantage of the outlet $PM_2$ is accordingly the same as for the outlet $PM_1$, that is, the difficulty of coiling up cable to connect it to the two connection plugs $F_3$, $F_4$. These problems of the radius of curvature and of cable coiling are even more tricky to solve than in the case of the plugs shown in $PM_1$. On the other hand, this installation, with connection plugs oriented downward in the mosaic, prevents all the dust located in great amounts on the floor of the office from collecting on the plugs.

The outlets $PM_1$ and $PM_2$ practically require prewiring and preconnectorization (with the plugs $F_1$–$F_2$ or $F_3$–$F_4$). This assumes that the problem of the radius of curvature and coiling of the fiber is mastered. The present invention makes it possible to overcome these problems while meeting all the characteristics and qualities described above.

SUMMARY OF THE INVENTION

According to the invention, the wall outlet for connection of an optical building wiring system, including:

a receptacle adapted to be fixed in the baseboard of the wall, into which receptacle the optical cords carrying the information to be transmitted to the local area network of the building including a plurality of terminals are inserted, and means for connecting the cords to the terminal associated with the outlet, is characterized in that the connection means include:

a removable cover associated with a removable carrier of connectors that facilitates the optical connection of said cords, the cover has a first standby position, in which it closes the front face of the receptacle, and second active position for use where the plane of the cover forms a dihedron with the front face, the cords then exiting laterally relative to the receptacle on either side thereof, parallel to the baseboard, including first positioning means cooperating with second positioning means, associated with the receptacle, in such a way as to shift the cover from the standby position to the active position for use.

BRIEF DESCRIPTION OF THE DRAWINGS

Further characteristics and advantages of the present invention will become apparent from the ensuing description given by way of non-limiting example, in conjunction with the accompanying drawings.

In these drawings:

FIG. 1, composed of FIGS. 1a and 1b, shows two examples of a wall connection outlet according to the prior art;

FIG. 2, composed of FIGS. 2a and 2b, shows the receptacle of the wall outlet according to the invention, intended to receive the cover and the connector carrier;

FIG. 3, composed of FIGS. 3a, 3b, 3c, which are three-quarter perspective views, show the various constituent elements of a first exemplary embodiment of the cover intended to be inserted into the receptacle;

FIG. 5, composed of FIGS. 5a and 5b, shows the second embodiment of the cover belonging to the wall outlet of the invention, with FIG. 5a being a three-quarter rear perspective view and FIG. 5b being a three-quarter front perspective view.

FIG. 6, composed of FIGS. 6a, 6b and 6c, shows in further detail the front face of the second model of the wall connection outlet according to the invention;

FIGS. 16 and 17, the latter being composed of FIGS. 17a and 17b, show a third embodiment of the wall outlet according to the invention.

DESCRIPTION OF THE PREFERRED EMBODIMENTS

FIGS. 2, 3, 4 and 5 will now be described, which show the various essential constituent elements of the optical wall outlet according to the invention, which correspond to the first and second embodiment of the outlet of the invention, respectively, that is, $PMI_1$ and $PMI_2$.

Figure 2A:
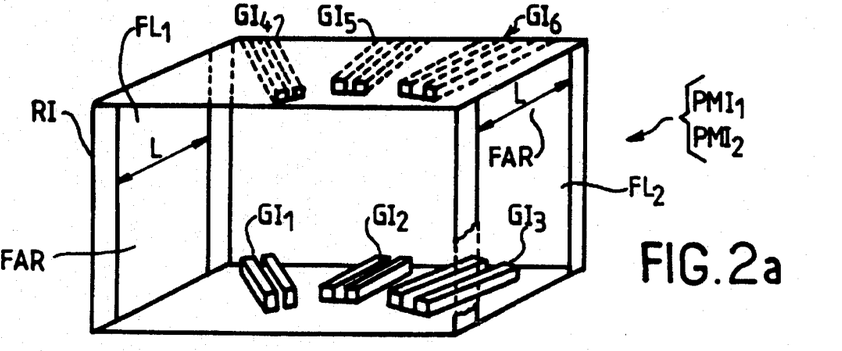
Figures 2B, 3A:
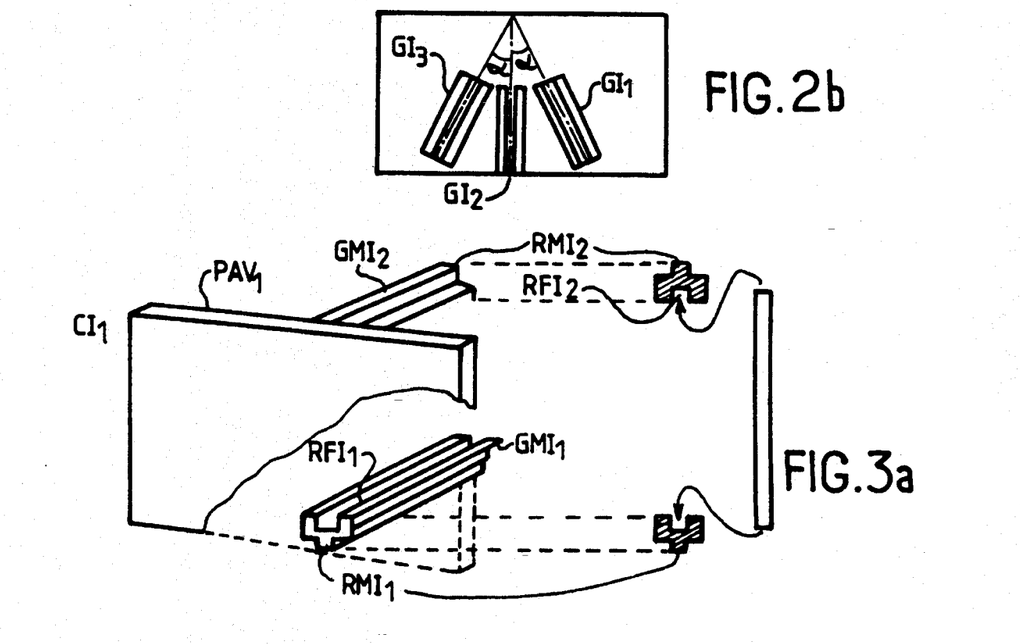
Figure 3B:
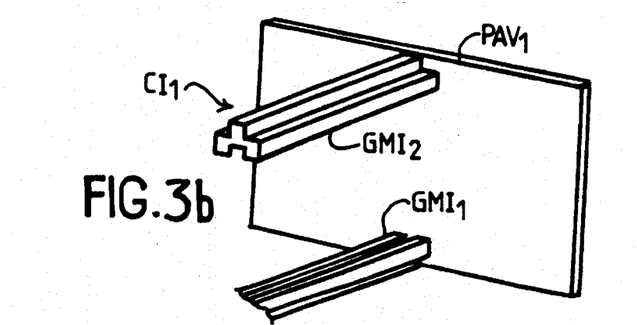
Figure 3C:
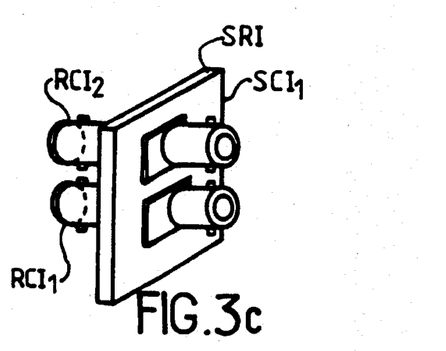
Figure 4:
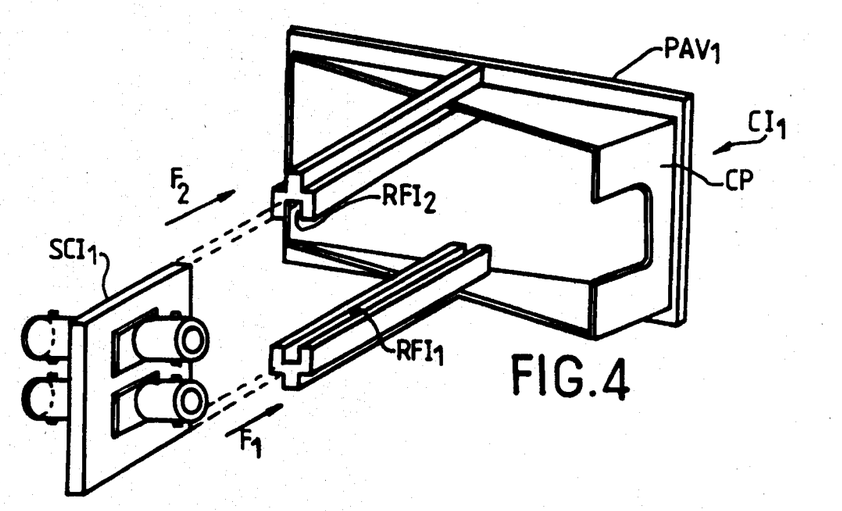
FIG. 4 is a three-quarter perspective showing how the connector carrier is inserted inside the first model of the cover belonging to a wall outlet according to the invention. This figure also shows the dust protection system, which protects the optical connection when the cover is in the position for use but is not shown in the other drawing figures that show the cover.

The first embodiment $PMI_1$ is formed by associating the receptacle RI, shown in FIGS. 2a and 2b, with the cover $CI_1$ and the connector carrier $SCI_1$ shown in FIGS. 3a, 3b and 3c, as well as FIG. 4.

Figure 5A:
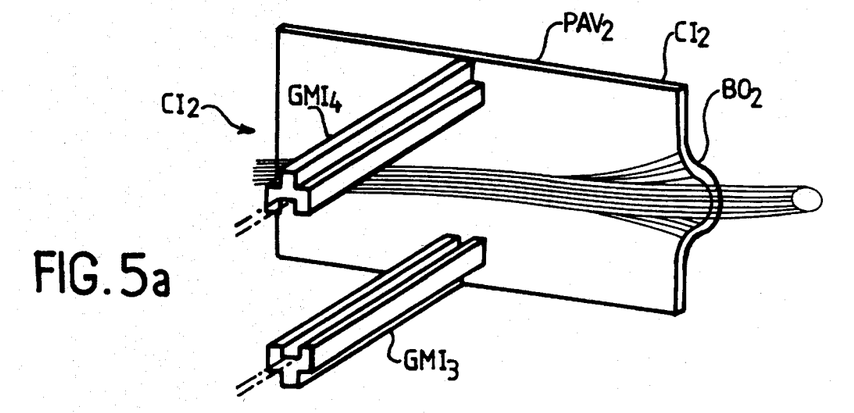
Figure 5B:
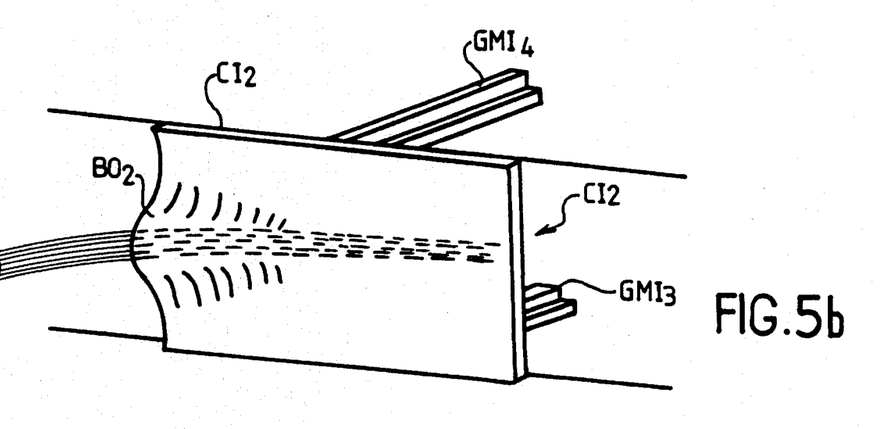

In addition, the second embodiment $PMI_2$ is formed by associating the receptacle RI shown in FIGS. 2a and 2b with the cover CI2 shown in FIGS. 5a and 5b.

Turning to the receptacle RI shown in FIG. 2: it is of rectangular parallelepiped form, and its rear face FAR is the one by which the receptacle RI is fixed to the baseboard of the wall, which is identical to the baseboard PL shown in FIGS. 1a and 1b. It is understood that the rear face FAR is fixed to this baseboard by any appropriate means, such as by fitting in a niche or by any other fixation means, such as screwing.

The front face FAV of the receptacle RI is the one by which one or the other of the two covers $CI_1$ and $CI_2$, shown in FIGS. 3 and 4 on the one hand and FIG. 5 on the other, is introduced. When these covers are fixed inside the receptacle, the front face FAV is closed completely or partially by the main face of one or the other of the aforementioned two covers (see hereinafter).

The receptacle RI includes, disposed on its upper and lower faces, inside the receptacle, three pairs of rails: The pair $GI_1$ and $GI_4$, the pair $GI_2$ and $GI_5$, and the pair $GI_3$ and $GI_6$. The three rails $GI_1$, $GI_2$, $GI_3$ are disposed on the lower face of the receptacle, while the rails $G_4$ through $G_6$ are disposed on the upper face. It is clear that inside each of the pairs of rails, the two rails composing the pair are facing. One can also say that they face one another. Hence the rail $GI_1$ faces the rail $GI_4$; $GI_2$ faces $GI_5$; and $GI_3$ faces $GI_6$. All these rails are female rails. The rails $GI_2$–$GI_5$ are the central rails, while the other two pairs are the side rails. The central rails are perpendicular to the rear face (their axis of longitudinal symmetry is perpendicular to this rear face), while the lateral rails form an angle $\alpha$ with the central rails (their axis of longitudinal symmetry forms an angle $\alpha$ with the axis of longitudinal symmetry of the central rails). This angle $\alpha$ is shown particularly clearly in FIG. 2b, which is a view from above of the lower rails $GL_1$ through $GL_3$, seen from the rear face FAR. The cross section of the rails may be of any shape. In FIGS. 2a and 2b, they have been shown with a rectangular cross section. It is understood that the central portion of the rails, which is hollow, is what is called the cross section of the rails. This cross section is marked S.

In FIG. 2a, it can be seen that the side faces $FL_1$ and $FL_2$ perpendicular to the baseboard PL are open wide; that is, in their central portion they include a rectangular recess of width L, which enables the passage of the optical fiber cords.

The description now turns to FIGS. 3 and 4, which show the first embodiment $CL_1$ of the cover belonging to the wall outlet of the invention. This cover $CL_1$ includes a front portion $PAV_1$ that is rectangular and whose dimensions are practically the same as those of the front face FAV of the receptacle RI. It is understood that the size of this front portion $PAV_1$ is slightly smaller, by a fraction on the order of tenths of millimeters, than the front face FAV, to allow it to be inserted inside the receptacle. In certain cases, it may also constitute a cap-type of closure, if it is slightly larger in size than the receptacle. The cover $CI_1$ further includes two male rails in its lower and upper portions, disposed substantially in the plane of symmetry of the front portion $PAV_1$ (the plane of symmetry which is perpendicular to the plane of the baseboard when the cover is inserted into the receptacle; these are a lower male rail $GMI_1$ and an upper male rail $GMI_2$, which are intended to be inserted into the cross section S of any of the three pairs of female rails $GI_1$–$GI_4$, $GI_2$–$GI_5$, $GI_3$–$GI_6$. In this way, each of the rails $GMI_1$ and $GMI_2$ respectively includes one male groove member $RMI_1$ and $RMI_2$. The cross section of these male groove member is shown as rectangular in FIGS. 3a, 3b and 4. This rectangular cross section has the same surface area as the rectangular cross section S of the female grooves of the female rails shown in FIGS. 2a and 2b, in order to enable the male members $RMI_1$ and $RMI_2$ to be inserted into the female grooves of the pairs of rails of the receptacle. Thus as can be seen from FIGS. 3 and 4, the male members $RMI_1$ and $RMI_2$ are disposed in the lower and upper portion, respectively, of the corresponding male rails $GMI_1$ and $GMI_2$. Furthermore, each of the male rails $GMI_1$ and $GMI_2$ includes female grooves $RFI_1$ and $RFI_2$. Also shown in rectangular cross section in these same drawing figures, $RFI_1$ and $RFI_2$ are situated in the upper portion of $GMI_1$ and the lower portion of $GMI_2$, respectively. Thus as can be seen from FIG. 3a, for example, the female groove $RFI_1$ is situated above the groove member $RMI_1$. In the same way, the male groove member $RMI_2$ is located above the female groove $RFI_2$.

A dust cover CP has also been shown, solidly joined to $PAV_1$.

It can also be seen that the axis of longitudinal symmetry of the male rails $GMI_1$ and $GMI_2$ is perpendicular to the plane of the front portion $PAV_1$.

The two female grooves $RFI_1$ and $RFI_2$ are intended to receive the connector carrier $SCI_1$, which is inserted by being slid inside them.

This connector carrier $SCI_1$ is shown in FIG. 3c. It includes a rectangular carrier SRI, for example of plastic material, and means for connecting optical fiber cords, constituted for example by two standardized ST-type connectors, indicated by reference symbols $RCI_1$ and $RCI_2$. It will be appreciated that any type of optical connector, preferably standardized, may be installed as the connection means on this connector carrier $SCI_1$.

The connector carrier $SCI_1$ is a removable part, and it can be introduced by sliding, from back to front as indicated in FIG. 4, perpendicular to the plane of $CI_1$. The support is introduced into the two female grooves $RFI_1$ and $RFI_2$.

The first embodiment of the cover $CI_1$ can occupy two positions:

1. Standby Position

In this case, the cover $CI_1$ is introduced into the pair of rails $GI_2$–$GI_5$. As a result, it completely closes the receptacle RI. There are two possibilities for the standby position. These are as follows:

a. Simple standby position: only the receptacle RI and the cover $CI_1$ are used; the connector carrier $SCI_1$ may or may not be installed in the grooves $RFI_1$ and $RFI_2$.

b. Wired standby position: in this case, the connector carrier SCI is installed in the grooves RFI1–$RFI_2$. It is connected to an incoming optical fiber cable but is not in use. The cover then completely closes the receptacle (it is understood that in this case, there is no outgoing optical cord to a terminal).

2. Position for Use

The cover $CI_1$ is introduced into one or the other of the pairs of lateral rails $GI_1$–$GI_4$ or $GI_3$–$GI_6$, depending on whether one wishes to have the cords to the terminal exit on the left or on the right, or naturally depending on the direction in which the optical fiber cable arrives from the subdistributor. In this case, the cover then has an opening enabling the exit of the cord horizontally and substantially parallel to the baseboard PL. This is especially demonstrated by FIG. 7, where the two incoming optical fiber cords $CO_1$ and $CO_2$ are seen, which then pass to inside the side face $FL_1$ of the receptacle RI, in the open portion of this lateral part, and the outgoing cords $CO_3$ and $CO_4$ (corresponding to the respective incoming cords $CO_1$ and $CO_2$) are seen, which go toward the terminal T installed in the office where the wall outlet $PMI_1$ is mounted. It can clearly be seen from the drawing that the cover $CI_1$ is shown in the pairs of lateral rails $GI_3$–$GI_6$, and as a result at an angle α with the plane of the front face FAV of the receptacle RI. Accordingly, there is a free space between the front face $PAV_1$ of the cover $CI_1$ and the front face $FAV_1$ of the receptacle RI, through which space the cords $CO_3$ and $CO_4$ pass. It is quite clear that both the cords $CO_1$ and $CO_2$ and the cords $CO_3$ and $CO_4$ are connected to the respective connection means $RCI_1$ and $RCI_2$ of the carrier $SCI_1$.

Turning to the second embodiment $PMI_2$ of the wall outlet according to the invention: This second embodiment includes a receptacle RI, identical to that of the first embodiment and accordingly carrying the same symbol, and a cover $CI_2$. The latter includes a front portion $PAV_2$ to which the male rails $GMI_3$ and $GMI_4$ are fixed, whose structure is completely identical to that of the male rails $GMI_1$ and $GMI_2$ shown in FIGS. 3 and 4.

Figure 6A:
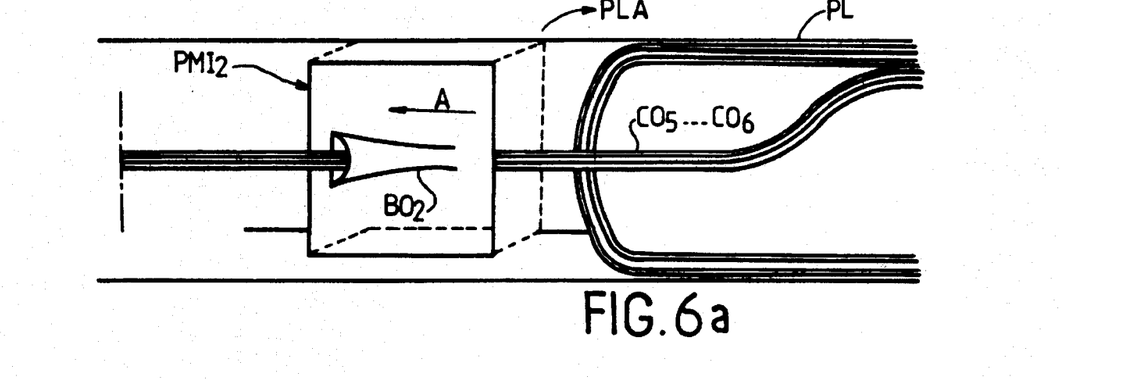
Figure 6B:
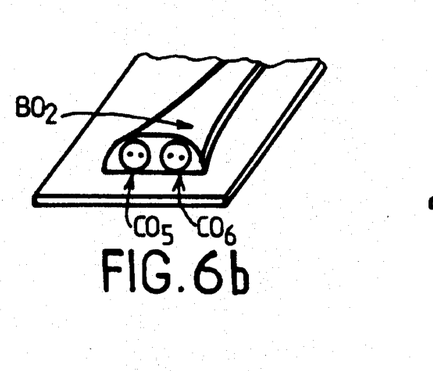
Figure 6C:
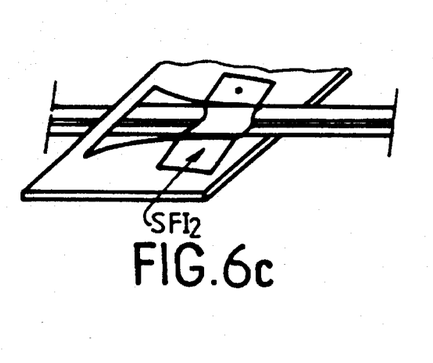

In these two FIGS. 5a and 5b, it can be seen that the front portion $PAV_2$ includes a boss $BO_2$, inside which one or two cords or even two cables (hence four optical fibers) can be passed, as can be better seen from FIG. 6b, which is a view from above of the boss $BO_2$ inside which the two cords $CO_5$ and $CO_6$ are passed. These two cords are embedded in a flexible gasket that holds them in place inside the boss $BO_2$. FIG. 6c shows the boss including the two cords $CO_5$ and $CO_6$ seen from above, with their fixation system $SFI_2$. In FIG. 6a, a complete view is given showing the two cords $CO_5$ and $CO_6$ coiled in the baseboard PL in the right-hand portion of the drawing and passing into the boss $BO_2$, with the cord inside the boss being parallel to the wall and the floor, as indicated by the arrow A, and the wall outlet $PMI_2$ being shown in three-quarter perspective mounted on the baseboard PL.

Figure 16:
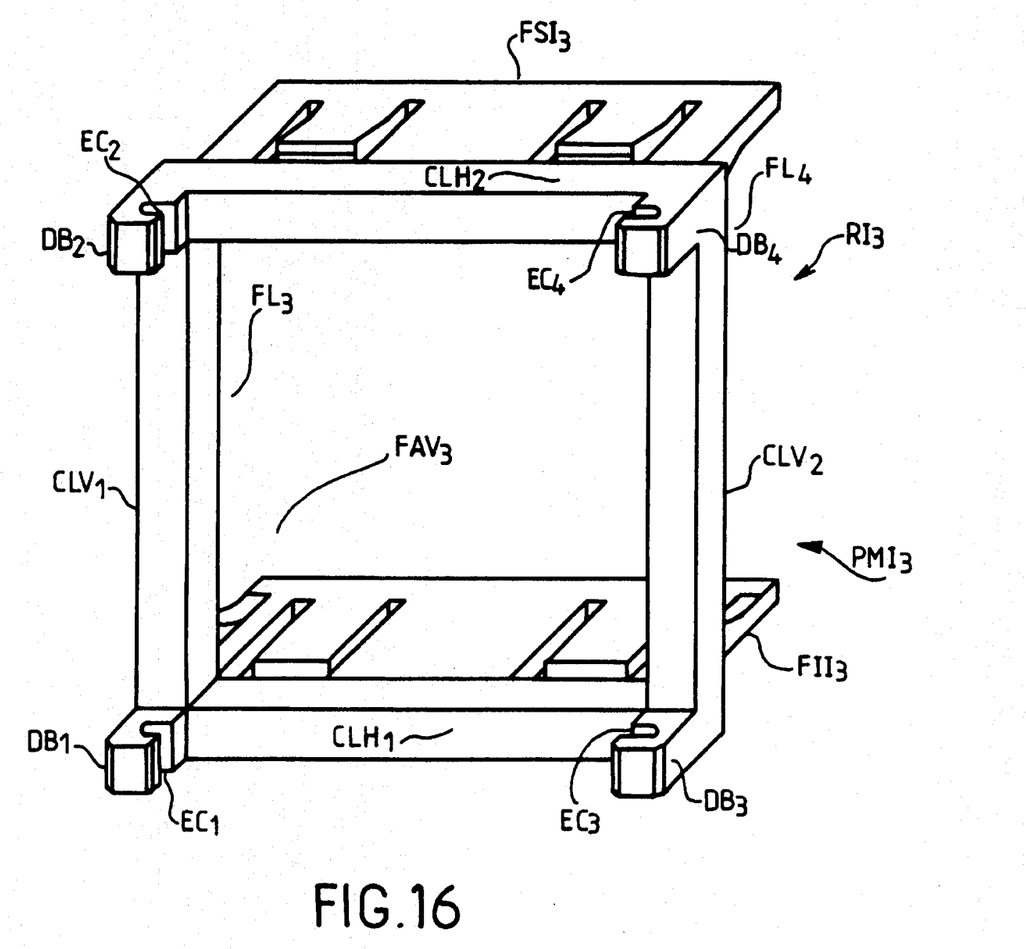
Figure 17A:
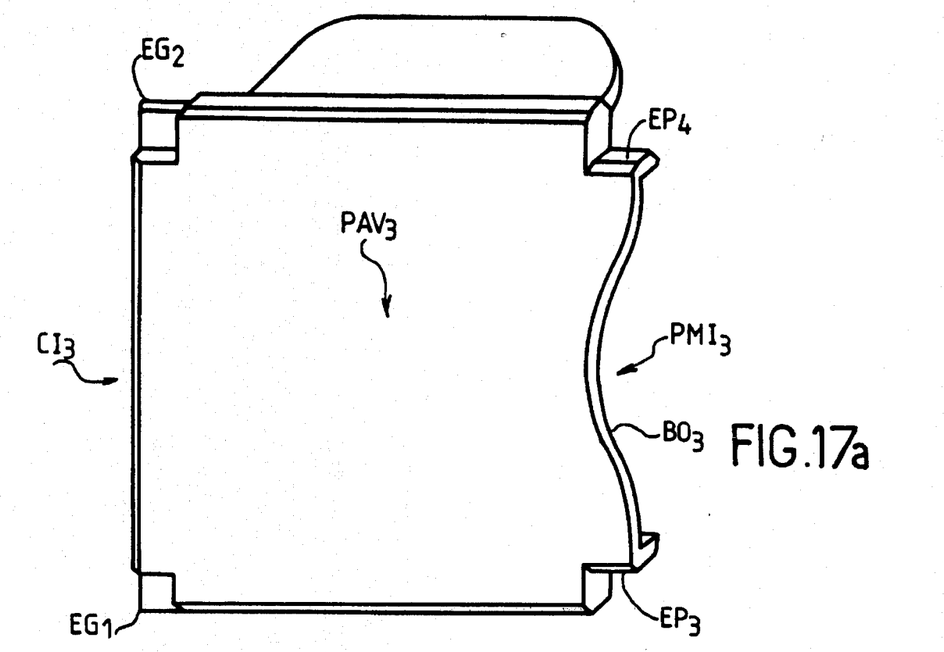
Figure 17B:
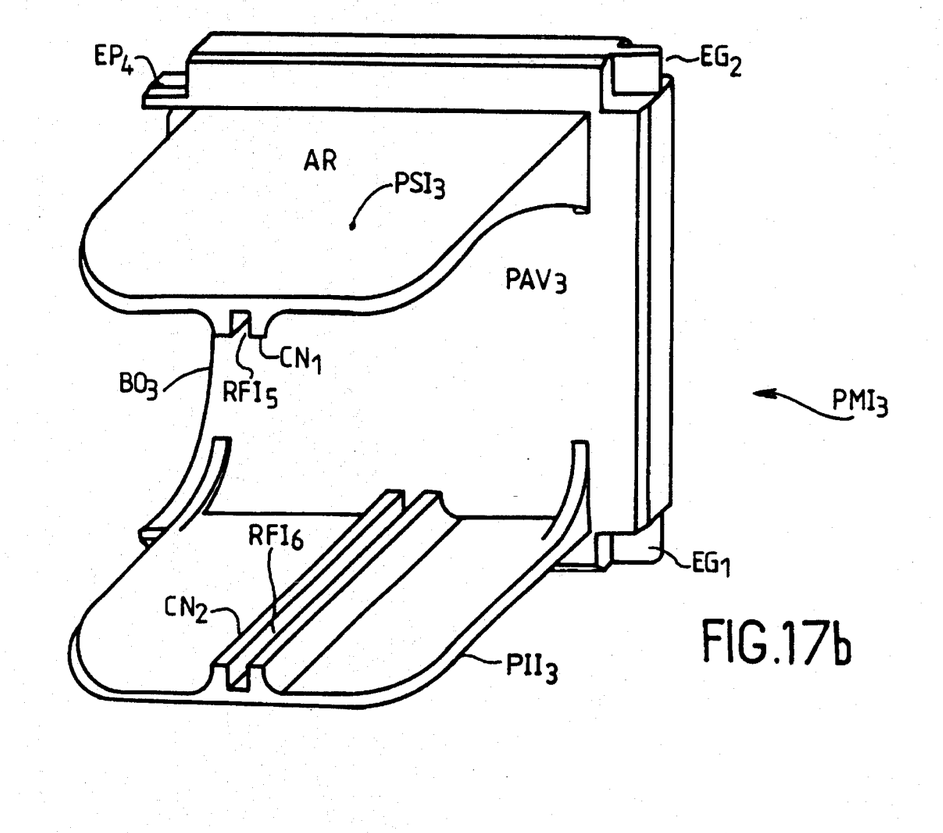

Turning to FIGS. 16, 17a and 17b: The third embodiment of the wall outlet of the invention includes a receptacle $RI_3$ and a cover $CI_3$. The receptacle is shown in FIG. 16, while the cover is shown in FIGS. 17a and 17b, FIG. 17a being a three-quarter front view while FIG. 17b is a three-quarter rear view.

If one looks at FIG. 16, one sees that the receptacle $RI_3$ no longer includes rails like the receptacle RI that is common to the first and second embodiments $PMI_1$ and $PMI_2$. The upper and lower horizontal sides $FSI_3$ and $FII_3$ of the receptacle $RI_3$, as can be seen in this same FIG. 16, include grooves that serve quite simply to facilitate mounting the receptacle inside the base board of the wall where it will be fixed. Hence there is no need to further describe these grooves or the mode of fixation of the receptacle inside the baseboard, which can be done in a known manner and in any case is not one of the characteristics of the invention.

The receptacle $RI_3$ includes a front face $FAV_3$ that includes a rectangular frame including two vertical lateral sides $CLV_1$ and $CLV_2$ and two horizontal lateral sides $CLH_1$ and $CLH_2$. The interior portion of this frame located inside the lateral sides is intended to be plugged completely by the cover $CI_3$ when the cover is in the standby position (see hereinafter), or to form a dihedron with an angle α with the cover in such a way as to allow the optical cords to pass between the front face $FAV_3$ and the surface of the cover, in a manner that is strictly identical to that shown in FIG. 7.

Figure 7:
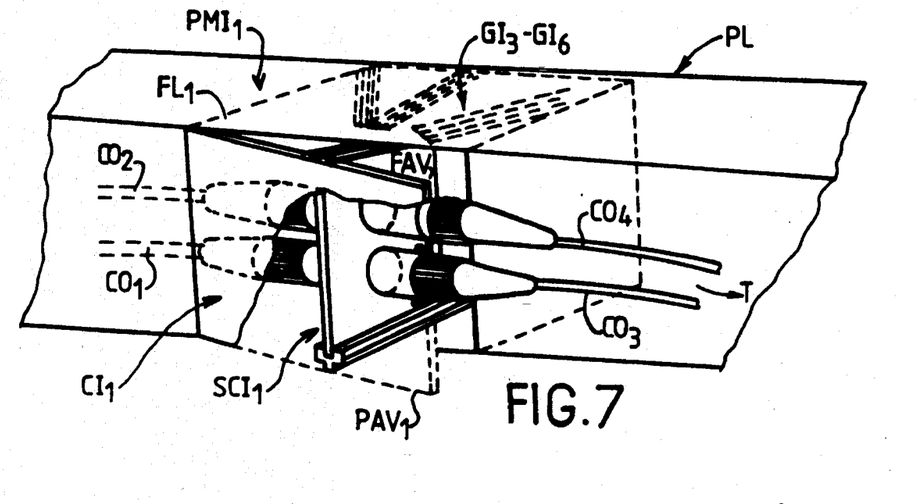
FIG. 7 shows in three-quarter perspective the first model of the wall outlet according to the invention, in the position for use.

The receptacle $RI_3$ also includes vertical lateral sides $FL_3$ and $FL_4$ (which are perpendicular to $FAV_3$), by way of which the optical cords can also pass, in the same way as in FIG. 7, for example.

The vertical lateral sides $CV_1$ and $CLV_2$ in their lower and upper portions include projections that protrude relative to the plane of these sides. These protruding projections are marked $DB_1$ (the lower portion) and $DB_2$ (the upper portion) for the vertical lateral side $CLV_1$, and $DB_3$ and $DB_4$ for the lower and upper portions of the vertical lateral side $CLV_2$. Each of the protruding projections $DB_1$ through $DB_4$ includes a niche, $EC_1$ through $EC_4$ respectively. Each of these niches is made inside the volume constituted by each of these projections $DB_1$ through $DB_4$. It can be seen in FIG. 16 that the niches $EC_1$ and $EC_3$ face one another, as do the niches $EC_2$ and $EC_4$.

Turning now to FIGS. 17a and 17b, these show the cover $CI_3$. This latter has a front portion $PAV_3$ of substantially rectangular shape, which may include a boss $BO_3$ identical to the boss of the cover $CI_2$ shown for example in FIG. 5a or FIG. 5b. Moreover, $CI_3$ on its left-hand lateral side in FIG. 17A (right-hand lateral side in FIG. 17b), in its lower and upper portions, includes respective pins $EG_1$, $EG_2$ intended to be inserted inside the niches $EC_1$ and $EC_2$ of FIG. 16. These pins $EG_1$ and $EG_2$ can also be inserted into the niches $EC_3$ and $EC_4$. In the first case (pins inside the niches $EC_1$ and $EC_2$), the wall outlet thus constituted has a vertical hinge around which the cover $CI_3$ can pivot relative to the face $FAV_3$, in such a way that the cover forms a dehedron of angle α with this face, exactly in the same way as shown in FIG. 7. In this case, the optical cords pass between the from face $FAV_3$ of the receptacle $RI_3$ and the front portion $PAV_3$ of the cover $CI_3$. It is understood that the front face $PAV_3$ may be placed against the front face $FAV_3$, and in that case the cover $CI_3$ completely closes the receptacle $RI_3$. The wall outlet $PMI_3$ is then in what can be called a standby position, described more specifically below.

Hence as can be seen in the right-hand portion of FIG. 17a and the left-hand portion of FIG. 17b, the portion $PAV_3$ of the cover $CI_3$ includes, in its lower and upper portions, respectively, shoulder $EP_3$ and $EP_4$ which are intended to come into contact with the projections $DB_4$ (in the lower part thereof) and $DB_3$ (in the upper part thereof in FIG. 16) when the cover $CI_3$ comes to close the receptacle $RI_3$.

Turning to FIG. 17b, one can also see that the cover $CI_3$ includes upper and lower faces $PSI_3$ and $PII_3$, which are horizontal and are intended to come into contact with the lower and upper portions, respectively, of the upper and lower faces $FSI_3$ and $FII_3$, respectively, of the receptacle $RI_3$. Moreover, the upper portion $PSI_3$, in the center of its lower portion, includes a bar or channel member $CN_1$ in the form of a U. The lower part $PII_3$ also includes an angle bar $CN_2$ in its central and upper portion, also in the form of a U. The two channel members $CN_1$ and $CN_2$ face one another and moreover include female grooves $RFI_5$ and $RFI_6$. The connector carrier $SCI_1$ shown in FIG. 4 can be inserted into the interior of these female grooves.

The covers $CI_1$, $CI_2$ and $CI_3$ can occupy two positions, as follows:

1. Standby Position

In the same way as the cover $CI_1$, the cover $CI_2$ is introduced into the central rails $GI_2$–$GI_5$, and as a result completely closes the receptacle. It should be noted that in all the cases of use, $CL_2$ can also receive the connector carrier $SCI_1$.

2. Position for Use

In this position, the cover $CI_2$ remains introduced in the central rails of the receptacle. Its specific role is then to enable the passage of one or two cords, thanks to the boss $BO_2$, without being connected to them. There is accordingly economy both in terms of the optical budget, since there is less attenuation of the signal transmitted and since connection means, which always weaken the signal, are not used, and in terms of cost, since connection means are dispensed with. The cords $CO_5$–$CO_6$ (or only one of them, $CO_5$ or $CO_6$) exit toward the terminal T in use, either on the right or left in FIG. 5, by simply inverting the cover $CI_1$ from top to bottom or bottom to top.

Figure 8:
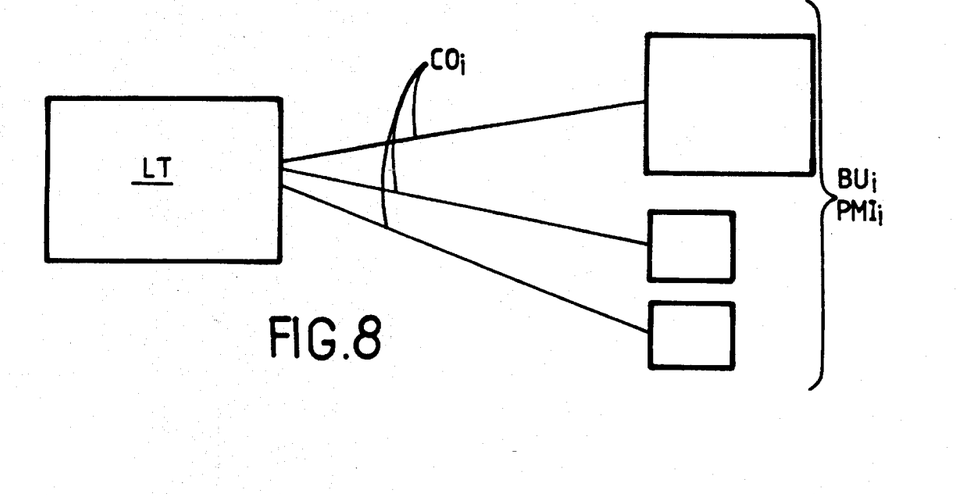
FIGS. 8 and 9 show two ways of making connections between a technical site including a subdistributor and various access points located inside an office.
Figure 9:
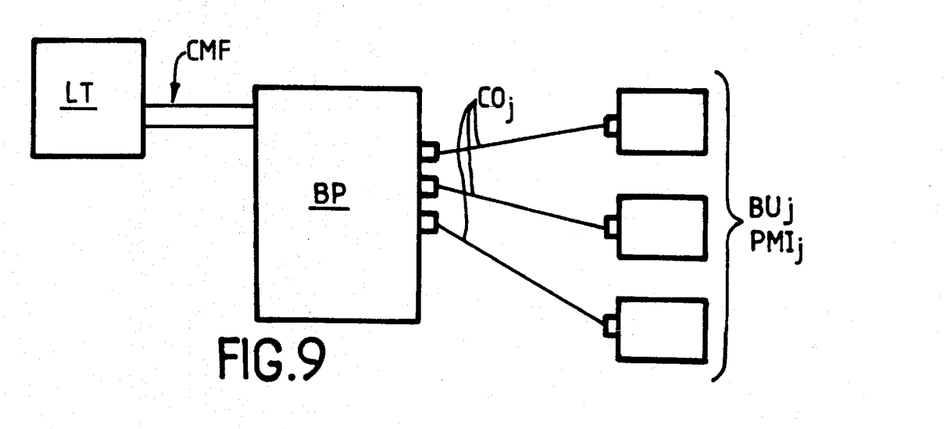
Figure 10:
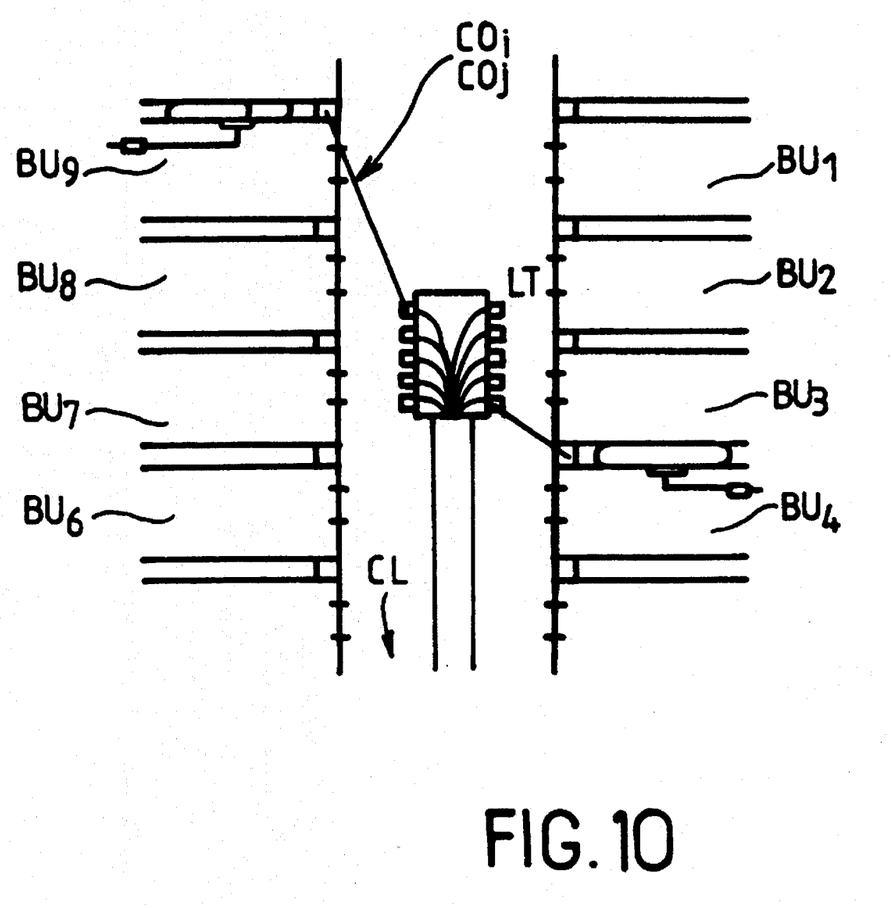
FIG. 10 is another drawing, extremely simplified, showing how the distributors are connected to the various offices.

Turning now to FIGS. 8, 9, 10, these show schematically how the technical site including the subdistributors are connected to the various optical wall outlets located in one or more offices. Thus in FIG. 8, a technical site LT is seen, connected to a set of offices $BU_i$ in FIG. 8 and $BU_j$ in FIG. 9. In FIG. 10, the technical site LT is connected to a plurality of offices $BU_1$ through $BU_9$, which are assumed to be distributed on either side of a corridor CL, while the technical site is assumed to be shown in the middle of the corridor.

As can be seen in FIG. 8, the technical site in a first embodiment is connected by a set of dual-fiber cords $CO_i$ (in FIG. 8, three cords are shown but there may be more) to the office $BU_i$, in which a set of wall outlets $PMI_i$ is located. It is understood that there may be one or more wall outlets, of the type shown in FIGS. 2–7, in each of the offices belonging to the set $BU_i$.

In FIG. 9, a second type of linkage between the technical site LT and the set of offices $BU_j$ can be seen, the offices being provided with a set of wall outlets $PMI_j$ according to the invention. The technical site LT is first connected to a proximity box BP by way of a multifiber cable CMF. The proximity box BP is in turn connected, by way of a set of dual-fiber cords $CO_j$ similar to $CO_i$, to all the offices $BU_j$ provided with the wall outlets $PMI_j$.

In FIG. 10, the technical site LT is shown connected by way of dual-fiber cords, similar to $CO_i$ or $CO_j$, to various offices. These cords $CO_i$ and $CO_j$ are disposed inside a false floor in the corridor CL, and from this false floor they are redistributed to the interior of each of the offices $BU_1$ through $BU_9$.

The optical fiber linkage between the technical site LT and one or the other of the wall outlets $PMI_i$ or $PMI_j$ can be done by prewiring or postwiring, with or without mounting of the connectors at the moment of installation (that is, with or without the presence of the connector carrier of the type $SCI_1$).

The use of a proximity box makes it possible to reduce the distance between the subdistributor contained in the local site and the wall outlets. In that case, it is then possible to use cords that are preconnected by the manufacturer at the factory and hence are more reliable between the proximity box BP and the various wall outlets.

One or the other of the two embodiments of wall outlets according to the invention make it possible to handle all the instances of possible uses described above.

In particular, one can now turn to FIGS. 11–15, which more specifically show what these various instances of use are.

Figure 11:
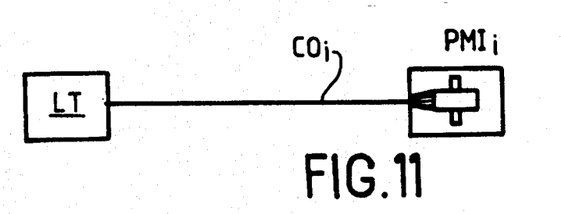
FIGS. 11–15 show various ways how one or the other of the two models of the wall connection outlet according to the invention are used.

First, turning to FIG. 11: This shows a prewired standby linkage. The cover $CI_1$, being equipped with its connector carrier $SCI_1$, closes the receptacle RI of the wall outlet, here identified by the symbol PMIi. The connector $SCI_1$ is connected to the technical site LT by the cable $CO_i$.

Figure 12:
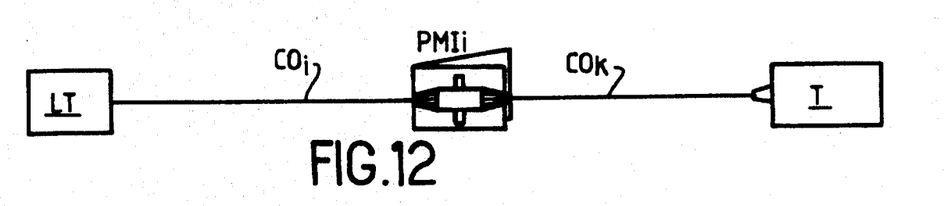

Turning to FIG. 12, this shows a prewired or postwired linkage in the position for use, the cover $CI_1$ being used and enabling the exit toward the right of the cord $CO_k$ going to the terminal T; the technical site LT is connected as in FIG. 11 to the wall outlet $PMI_i$, by the cable $CO_i$. For further detail on FIG. 12, it will be useful to refer to FIG. 7.

Figure 13:
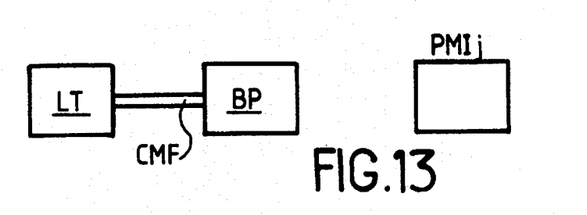

Turning to FIG. 13: This drawing corresponds to that shown in FIG. 9; that is, the technical site LT is connected by a multifiber cable CMF to a proximity box BP. In the instance shown in FIG. 13 the wall outlet $PMI_j$ is on standby, and the cover of the outlet, whether it is the cover $CI_1$ or $CI_2$, closes the receptacle RI. In FIG. 13, the situation is on standby for postwiring.

Figure 14:
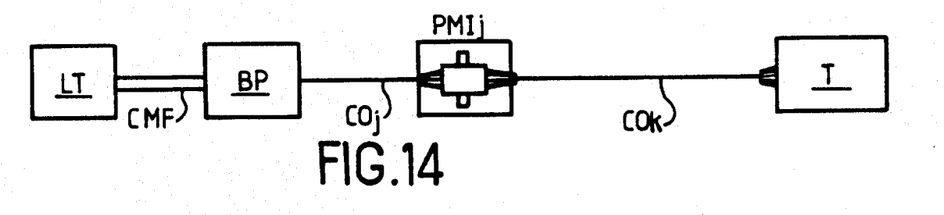

Turning to FIG. 14, it has been assumed that the wall outlet $PMI_j$ is of the first embodiment, that is, with a cover of the type $CI_1$. A linking cord $CO_j$ is used between the proximity box BP and the wall outlet $PMI_j$, and the terminal T is connected to this wall outlet by way of a cord $CO_k$. The two cords $CO_j$ and $CO_k$ are connected to a connector carrier of the type $SCI_1$. In that case, the cover the type $CI_1$ is in the position for use, enabling the exit of the cord, for instance toward the right. In the case of FIG. 14, either prewiring or postwiring is involved.

Figure 15:
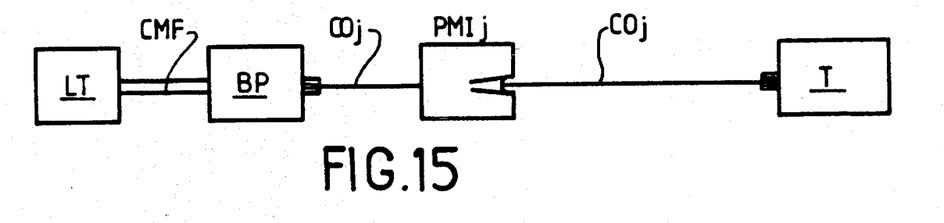

Turning to FIG. 15: in this figure, the technical site LT is always connected to a proximity box BP by way of a multifiber cord CMF. The proximity box is connected directly to the terminal T by the cord $CO_j$. For that purpose, the cover of the type $CI_2$ is used, which completely closes the receptacle RI while allowing the cord $CO_j$ to pass by way of the boss of the type $BO_2$. In FIG. 15, the wall outlet is identified by the symbol $PMI_j$. For the equipment shown in FIG. 15, a cord $CO_j$ is used, which is prewired directly in the factory of manufacture, with an attendant decrease in cost, reliability and installation speed and even disconnection speed.

In summary, the advantages of the wall outlet according to the invention are seen to be as follows:

- the possibility of economizing on one connection with the cover of the type $CI_2$;
- the possibility of arrival or departure of the linking cord toward the wall outlet either on the right or on the left thereof (see FIG. 7, for example);
- both the incoming and outgoing directions of the horizontal cord are parallel to the baseboard, which assures better protection of the cord and offers the best solution in terms of the problem of the radius of curvature R of the optical cord, by facilitating coiling thereof;
- the wall outlet is very low in cost;
- it is easy to install, requiring no specialized tool whatever;
- all possible kinds of use are feasible, with any type of connector;
- of wall outlets according to the invention can be used with either prewiring or postwiring.

We claim:

1. A wall outlet ($PMI_1$ through $PMI_3$) for connection of an optical building wiring system, including:

a receptacle (RI, $RI_3$) adapted to be secured to a baseboard (PL) of a wall, into which receptacle optical cords ($CO_i$, $CO_j$, $CO_1$ through $CO_4$) carrying information to be transmitted to a local area network of the building including a plurality of terminals are inserted, means ($CI_1$, $CI_2$) for connecting the cords to the terminals associated with the outlet, wherein the means for connecting the cords include:

a removable cover ($CI_1$ through $CI_3$) associated with a removable carrier ($SCI_1$) of connectors that facilitates optical connection of said cords, the cover, having a first standby position, in which said cover closes the front face of the receptacle, and a second active position for use where the plane of the cover forms a dihedron with said front face, the cords being disposed, when said cover is in the second active position, laterally relative to the receptacle on either side thereof, parallel to the baseboard, including first positioning means ($GMI_1$–$GMI_2$, $G_1$, $EG_2$) cooperating with second positioning means ($GI_1$–$GI_6$, $EC_1$–$EC_2$, $EC_3$–$EC_4$), associated with the receptacle, so as to shift the cover from the standby position to the active position for use, and further wherein the receptacle includes side portions (FL1, FL2) which extend perpendicular to the baseboard, each of said side portions including an opening therein for enabling passage of the cords therethrough such that said cords extend parallel to said baseboard inside said wall, and further wherein the removable carrier (SCI1) includes connection means (RCI1, RCI2) for connecting said cords thereto, said removable carrier (SCI1) being adapted to be mounted perpendicular to the cover such that said cords extend parallel to the baseboard inside and outside said wall when connected thereto.

2. The wall outlet of claim 1, wherein the receptacle ($RI_3$) includes on two vertical sides of a front face, in the lower and upper portion thereof, projections ($DP_1$ through $DP_4$) relative to the plane thereof, said projections each containing a niche ($EC_1$ through $EC_4$), the cover ($CI_3$) including in a front portion, on one of the vertical sides in the lower portion and upper portion thereof, a pin ($EG_1$, $EG_2$) adapted to be inserted into a niche in the receptacle, the wall outlet formed by the cover ($CI_3$) and the receptacle ($RI_3$) having a hinge around which the cover pivots by an angle of value $\alpha$ in such a way as to allow lateral emergence of the cords relative to the receptacle on either side thereof, parallel to the baseboard.

3. The wall outlet of claim 1, wherein the removable cover comprises a front portion (PAV3) adapted to close the receptacle, and horizontal lower and upper faces (PSl3, Pll3) perpendicular to the front portion and including respectively in the center of their upper and lower portion angle bars (CN2, CN1) which face one another and include grooves (RF16, RF15) into which is inserted the removable carrier.

4. The wall outlet of claim 3, wherein the receptacle Rl3) includes on two vertical sides of a front face, in the lower and upper portion thereof, projections ($DP_1$ through $DP_4$) relative to the plane thereof, said projections each containing a niche ($EC_1$ through $EC_4$), the cover ($CI_3$) including in a front portion, on one of the vertical sides in the lower portion and upper portion thereof, a pin ($EG_1$, $EG_2$) adapted to be inserted into a niche in the receptacle, the wall outlet formed by the cover ($CI_3$) and the receptacle ($RI_3$) having a hinge around which the cover pivots by an angle of value $\alpha$ in such a way as to allow lateral emergence of the cords relative to the receptacle on either side thereof, parallel to the baseboard.

5. A wall outlet ($PMI_1$ through $PMI_3$) for connection of an optical building wiring system, including:

a receptacle (RI, $RI_3$) adapted to be secured to a baseboard (PL) of a wall, into which receptacle optical cords ($CO_i$, $CO_j$, $CO_1$ through $CO_4$) carrying information to be transmitted to a local area network of the building including a plurality of terminals are inserted, means ($CI_1$, $CI_2$) for connecting the cords to the terminals associated with the outlet, wherein the means for connecting the cords include:

a removable cover ($CI_1$ through $CI_3$) associated with a removable carrier ($SCI_1$) of connectors that facilitates optical connection of said cords, the cover, having a first standby position, in which said cover closes the front face of the receptacle, and a second active position for use where the plane of the cover forms a dihedron with said front face, the cords being disposed, when said cover is in the second active position, laterally relative to the receptacle on either side thereof, parallel to the baseboard, including first positioning means ($GMI_1$–$GMI_2$, $G_1$, $EG_2$) cooperating with second positioning means ($GI_1$–$GI_6$, $ED_1$–$EC_2$, $EC_3$–$EC_4$), associated with the receptacle, so as to shift the cover from the standby position to the active position for use, and further wherein the removable cover ($CI_1$, $CI_2$) is adapted for insertion into a system of rails ($GI_1$–$GI_4$, $GI_2$–$GI_5$, $GI_3$–$GI_6$) disposed inside the receptacle (R1) on upper and lower faces thereof, the connector carrier ($SCI_1$) adapted to be introduced by sliding inside grooves (RFI1, $RFI_2$) carried by the cover.

6. The wall outlet of claim 5, wherein the rails of the receptacle (RI) include a first pair of central rails ($GI_2$–$GI_5$), and two second pairs ($GI_1$–$GI_4$, $GI_3$–$GI_6$) of lateral rails disposed on either side of the first pair of central rails, each forming an angle $\alpha$ with the pair of central rails, the rails of a same pair facing one another.

7. The wall outlet of claim 6, wherein the removable cover ($CI_1$) includes a front portion ($PAV_1$) adapted to close a front face (FAV) of the receptacle, including a third pair of rails ($GMI_1$, $GMI_2$) disposed substantially in a plane of vertical symmetry that is perpendicular to the face, each rail adapted to cooperate with a corresponding rail of a first pair or with any one of the second pairs to permit insertion of the cover ($CI_1$) into the receptacle (RI).

8. The wall outlet of claim 6, wherein the removable cover ($CI_2$) includes a front portion ($PAV_2$) intended to close a front face ($FAV_1$) of the receptacle (RI), including a fourth pair of rails ($GMI_3$, $GMI_4$) disposed substantially in a plane of vertical symmetry that is perpendicular to the face, each rail of said fourth pair of rails adapted to cooperate with a corresponding rail of a first pair or with any one of the second pairs to permit insertion of the cover ($CI_2$) into the receptacle (RI), the front portion ($PAV_2$) further including an inside boss ($BO_2$) to which optical cords or cables are fixed that are parallel to the wall where the wall outlet is fixed and parallel to the floor that is perpendicular to the wall.

9. The outlet of claim 8 wherein the removable carrier ($SCI_1$) includes a rectangular carrier (SRI) and connection means ($RCI_1$, $RCI_2$) for fiber optical cords or cables fixed to the carrier, said carrier adapted to be inserted into grooves ($RFI_1$, $RFI_2$) located in any of a second, third or fourth pair of rails in the receptacle.

10. The outlet of claim 5, wherein the removable carrier ($SCI_1$) includes a rectangular carrier (SRI) and connection means ($RCI_1$, $RCI_2$) for fiber optical cords or cables fixed to the carrier, said carrier adapted to be inserted into grooves (RFI1, $RFI_2$) located in any of a second, third or fourth pair of rails in the receptacle.

* * * * *

UNITED STATES PATENT AND TRADEMARK OFFICE
CERTIFICATE OF CORRECTION

PATENT NO. : 5,473,717
DATED : December 5, 1995
INVENTOR(S) : René BAPTISTE et al It is certified that error appears in the above-indentified patent and that said Letters Patent is hereby corrected as shown below:

Col. 12, line 12 (Claim 5, line 22) "$ED_1$" should be --$EC_1$--;

Col. 12, line 20 (Claim 5, line 30) "RFI1" should be --$RFI_1$--;

Col. 12, line 58 (Claim 10, line 5) "RFI1" should be --$RFI_1$--.

Signed and Sealed this

Fourteenth Day of May, 1996

Attest:

BRUCE LEHMAN

*Attesting Officer*     *Commissioner of Patents and Trademarks*